US008813042B2

(12) United States Patent
Chakrabarti

(10) Patent No.: US 8,813,042 B2
(45) Date of Patent: Aug. 19, 2014

(54) IDENTIFYING GLOBALLY CONSISTENT STATES IN A MULTITHREADED PROGRAM

(75) Inventor: Dhruva Chakrabarti, San Jose, CA (US)

(73) Assignee: Hwlett-Packard Development Company, L. P., Houston, TX (US)

( * ) Notice: Subject to any disclaimer, the term of this patent is extended or adjusted under 35 U.S.C. 154(b) by 63 days.

(21) Appl. No.: 13/441,656

(22) Filed: Apr. 6, 2012

(65) Prior Publication Data
US 2013/0268945 A1 Oct. 10, 2013

(51) Int. Cl.
*G06F 9/44* (2006.01)

(52) U.S. Cl.
USPC ............. 717/131; 713/375; 716/18; 717/132; 718/100

(58) Field of Classification Search
None
See application file for complete search history.

(56) References Cited

U.S. PATENT DOCUMENTS

| | | | |
|---|---|---|---|
| 7,086,053 B2* | 8/2006 | Long et al. | 718/100 |
| 7,228,543 B2* | 6/2007 | Baylis | 718/1 |
| 7,305,582 B1 | 12/2007 | Moser et al. | |
| 7,406,698 B2* | 7/2008 | Richardson | 719/321 |
| 7,549,150 B2* | 6/2009 | Yu | 718/108 |
| 7,774,787 B2 | 8/2010 | Leino et al. | |
| 2001/0054057 A1* | 12/2001 | Long et al. | 709/108 |
| 2002/0184239 A1* | 12/2002 | Mosher et al. | 707/200 |
| 2004/0148603 A1* | 7/2004 | Baylis | 718/100 |
| 2007/0143742 A1* | 6/2007 | Kahlon et al. | 717/124 |
| 2007/0226740 A1* | 9/2007 | Li et al. | 718/102 |
| 2009/0132991 A1* | 5/2009 | Ganai et al. | 716/18 |
| 2009/0158075 A1* | 6/2009 | Biberstein et al. | 713/375 |
| 2009/0328045 A1* | 12/2009 | Burckhardt et al. | 718/102 |
| 2010/0174711 A1* | 7/2010 | Eidt et al. | 707/736 |
| 2010/0281471 A1* | 11/2010 | Liao et al. | 717/141 |
| 2011/0167412 A1* | 7/2011 | Kahlon et al. | 717/128 |
| 2011/0179399 A1* | 7/2011 | Bekiroglu et al. | 717/131 |
| 2011/0246970 A1* | 10/2011 | Ganai et al. | 717/132 |
| 2011/0276969 A1* | 11/2011 | Kahlon et al. | 718/102 |
| 2012/0011492 A1* | 1/2012 | Sinha et al. | 717/132 |

OTHER PUBLICATIONS

K. Whisnant, Z. Kalbarczyk, R. K. Iyer, "Micro-Checkpointing for Multithreaded Applications", Jul. 3, 2005, IEEE, (Whole Document).*
Diego Cucuzzo, Stefano D'Alessio, Francesco Quaglia, Paolo Romano, "A Lightweight Heuristic-based Mechanism for Collecting Committed Consistent Global States in Optimistic Simulation", 2007, IEEE, 227-234.*
Coburn, J., et al., NV-Heaps: Making Persistent Objects Fast and Safe with Next-Generation, Non-Volatile Memories, ASPLOS '11, Mar. 5-11, 2011, Newport Beach, CA, 13 pgs.
Dearle, A., On Page-based Optimistic Process Checkpointing, (Research Paper), Proceedings of the 4th International Workshop of the Object-Orientation in Operating Systems, Lund, Sweden, IEEE 1995, p. 24-32.
Saxena, M., et al., Hathi: Durable Transactions for Memory using Flash, HP External Posting, Sep. 21, 2011, 7 pgs.

(Continued)

*Primary Examiner* — Don Wong
*Assistant Examiner* — Roberto E Luna

(57) ABSTRACT

In a method of identifying a globally consistent state in a multithreaded program, a plurality of locally consistent states is identified, in which a locally consistent state of a thread comprises a set of memory locations and their corresponding data values accessed between points in the multithreaded program where no locks are held. Globally consistent states are identified based at least in part on the locally consistent states.

20 Claims, 5 Drawing Sheets

(56) References Cited

OTHER PUBLICATIONS

Venkataraman, S., et al., Consistent and Durable Structures for Non-Volatile Byte-Addressable Memory, Feb. 15, 2011, 9th USENIX Conference on File and Storage Technologies, San Jose, CA, 15 pgs.

Volos, H., et al., Mnemosyne: Lightweight Persistent Memory, ASPLOS '11, Mar. 5-11, 2011, Newport Beach, CA, 13 pgs.

Whisnant, K., et al., Micro-Checkpointing: Checkpointing for Multithreaded Application, (Research Paper), Proceedings of the 6th IEEE International On-Line Testing Workshop (IOLTW), Jul. 3-5, 2000, p. 3-8.

Ziarek, L., et al., Modular Checkpointing for Automicity, (Research Paper), Journal of Electronic Notes in Theoretical Computer Science (ENTCS), Jun. 2007, p. 85-115, vol. 174, No. 9.

* cited by examiner

300

```
┌─────────────────────────────────┐
│ IDENTIFY A PLURALITY OF LOCALLY │
│    CONSISTENT STATES IN THE     │
│      MULTITHREADED PROGRAM      │
│               310               │
└─────────────────────────────────┘
                 │
                 ▼
┌─────────────────────────────────┐
│ IDENTIFY THE GLOBALLY CONSISTENT│
│  STATE BASED AT LEAST IN PART   │
│   ON THE LOCALLY CONSISTENT     │
│             STATES              │
│               320               │
└─────────────────────────────────┘
                 │
                 ▼
┌─────────────────────────────────┐
│  REVERT A POTENTIALLY INCONSIS- │
│   TENT STATE OBTAINED ON A      │
│   PROGRAM CRASH TO A PRE-       │
│  IDENTIFIED GLOBALLY CONSISTENT │
│             STATE               │
│               330               │
└─────────────────────────────────┘
```

```
┌─────────────────────────────────────────────────┐
│ IDENTIFY UNIQUE MEMORY ADDRESSES THAT MAKE UP THE│
│      PRE-IDENTIFIED GLOBALLY CONSISTENT STATE   │
│                       410                        │
└─────────────────────────────────────────────────┘
                         │
                         ▼
┌─────────────────────────────────────────────────┐
│  COLLECT ALL MEMORY STATES THAT CORRESPOND TO WRITE │
│   REFERENCES TO THE UNIQUE MEMORY ADDRESS FROM A   │
│  PLURALITY OF LOCALLY CONSISTENT STATES THAT COMPRISE│
│   THE PRE-IDENTIFIED GLOBALLY CONSISTENT STATE FOR │
│            UNIQUE MEMORY ADDRESSES              │
│                       420                        │
└─────────────────────────────────────────────────┘
                         │
                         ▼
┌─────────────────────────────────────────────────┐
│  ADD A RECOVERY EDGE FROM A FIRST MEMORY STATE OF A │
│    PLURALITY OF COLLECTED MEMORY STATES TO A SECOND │
│      MEMORY STATE OF A PLURALITY OF COLLECTED MEMORY│
│  STATES CORRESPONDING TO AN IDENTICAL MEMORY ADDRESS│
│  WITHIN COLLECTED MEMORY STATES IF A PATH EXISTS FROM│
│    THE FIRST MEMORY STATE TO THE SECOND MEMORY STATE│
│    THROUGH HAPPENS-BEFORE RELATIONSHIPS THAT EXIST │
│            BETWEEN INDIVIDUAL MEMORY STATES     │
│                       430                        │
└─────────────────────────────────────────────────┘
                         │
                         ▼
┌─────────────────────────────────────────────────┐
│  IDENTIFY A MOST RECENT VALUE FOR EVERY UNIQUE MEMORY│
│                      ADDRESS                     │
│                       440                        │
└─────────────────────────────────────────────────┘
                         │
                         ▼
┌─────────────────────────────────────────────────┐
│   REVERT EVERY UNIQUE MEMORY ADDRESS TO A STATE OF THE│
│                  MOST RECENT VALUE              │
│                       450                        │
└─────────────────────────────────────────────────┘
```

FIG. 4

US 8,813,042 B2

IDENTIFYING GLOBALLY CONSISTENT STATES IN A MULTITHREADED PROGRAM

BACKGROUND

A multithreaded program is one in which there are multiple threads of control. A lock is a synchronization mechanism for enforcing limits on access to a resource in a multithreaded environment such that concurrency control is enforced. Another way of enforcing concurrency control is by using atomic sections. An atomic section refers to a section of code which provides atomicity, consistency, and isolation guarantees.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

FIG. 3 is a flowchart of a method for identifying a globally consistent state in accordance with one embodiment.

FIG. 4 is a flowchart of a method for reverting a potentially inconsistent state obtained on a program crash to a pre-identified globally consistent state in a multithreaded program in accordance with one embodiment.

DESCRIPTION OF EMBODIMENTS

Figure 1:
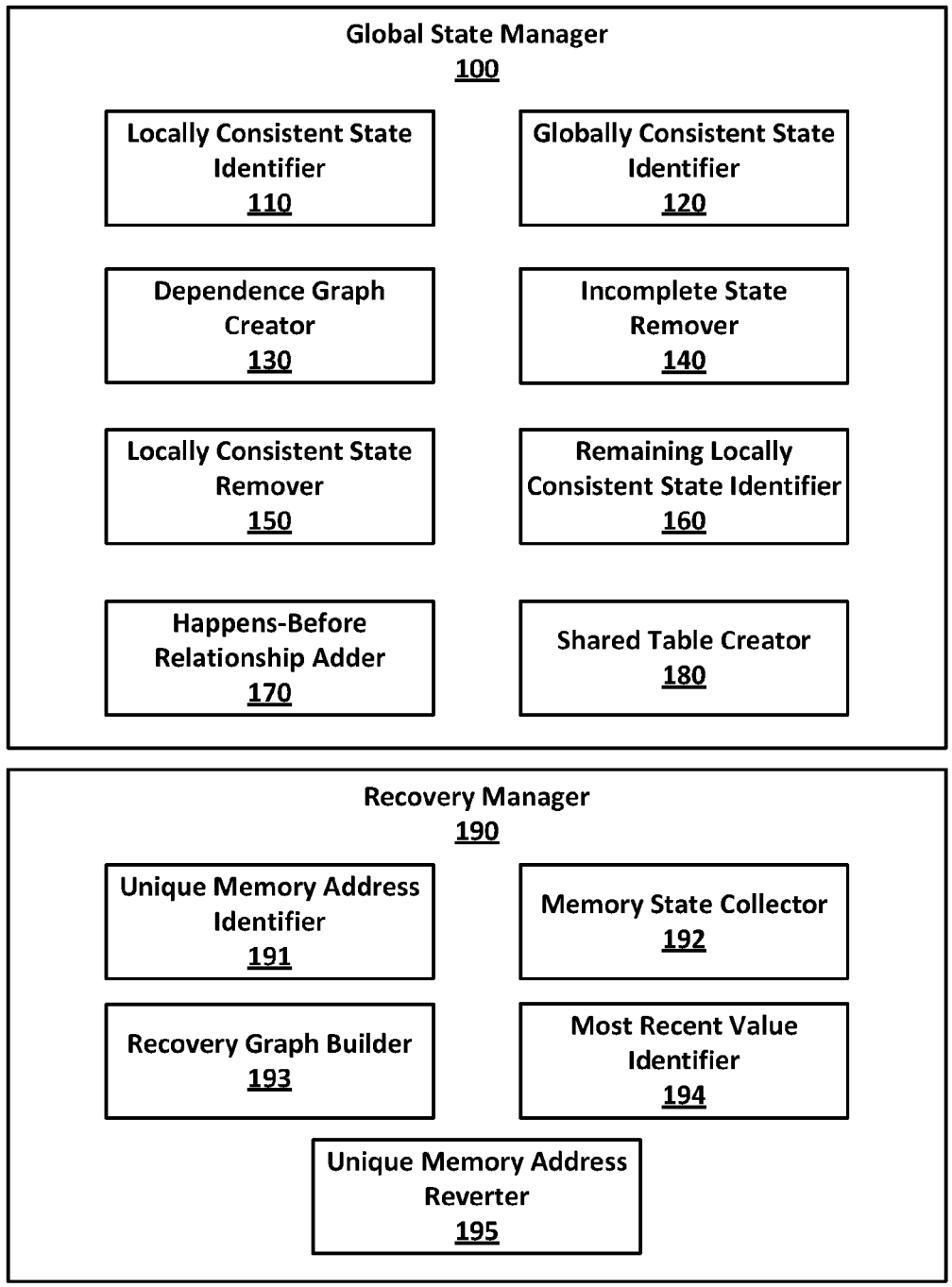
FIG. 1 shows an example global state manager and a recovery manager in accordance with one embodiment.

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, conventional methods, procedures, objects, and circuits have not been described in detail as not to unnecessarily obscure aspects of the subject matter.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions, terms such as "identifying", "creating", "removing", "adding", "reverting", "collecting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Overview of Discussion

Consistency is an attribute of data and indicates that invariants of an application are satisfied. These invariants are typically associated with semantics of an application. If data is inconsistent it often appears corrupt to an application. Conventionally, there is no way to tell during the execution of a lock-based multithreaded program whether a consistent state has been reached.

In the presence of memory mapped I/O or persistent memory (such as in the context of phase change memory, memristors, etc.), states of data structures may become persistent through regular byte-addressable writes of memory locations. This means that states of such data structures may outlive the lifetime of the application that creates such states. If there is a program crash during execution of such an application, the states of data structures on persistent media may be left inconsistent. This will render such persistent data corrupt and unusable for any subsequent application or computer process. This issue necessitates that computer systems provide ways to persist data in a manner that appears consistent to applications.

As an example, an implementation of an atomic section may provide atomicity, consistency, isolation, and durability (ACID) guarantees in the presence of memory mapped I/O or persistent memory. Atomicity guarantees that all or nothing of a section of code appear to execute. If a system crash happens in the middle of execution of an atomic section, no effects of the atomic section are visible to the external world since none of the changes have been committed. Isolation guarantees that accesses to shared locations are properly synchronized among threads. On the other hand, no similar guarantees are conventionally available in a lock-based multithreaded program written with critical sections or a combination of critical sections and atomic sections. A "critical section" refers to a section of code that executes while holding a lock. A critical section is one way of enforcing concurrency control.

This disclosure describes a technique to provide the following guarantees for critical sections: if any update made within a critical section is visible after a crash/restart, then all of its other updates will also be visible. If a first critical section is enclosed within a second critical section or if the second critical section happens before the first or if there is some flow of data from the second critical section to the first, then the effects of the first critical section will be visible to the external world only if the effects of the second critical section are also visible to the external world. The technique we describe here handles critical sections and atomic sections in a unified framework and thus works well for general multithreaded programs.

Herein, example techniques, devices, systems, and methods are presented for implementing a technique to identify globally consistent states of a program. Discussion begins with several components of an example global state manager. Next, locally consistent states and globally consistent states are discussed. Discussion continues with relationships between shared memory references and their states. Next, example methods of use are described. Lastly, an example computer environment is described.

A memory state is a duple comprising a memory address and a corresponding data value. Two graphs are maintained during program execution: happens-before graph at the level of memory states and a dependence graph at the level of locally consistent sections. If there is a system crash, a recovery graph is maintained during the post-crash restart process.

First to determine whether a consistent state has been reached in a multithreaded program, states of data structures in the multithreaded program are identified and a happens-before relationship graph is built between or among the states of the program. A locally consistent state (LCS) is defined, which potentially comprises many data structure states. Once the LCSs are identified, a dependence graph can be built at the level of LCSs which can be derived from the happens-before graph which was built for the memory states corresponding to memory references. After a dependence graph is created, a global state manager operation may be run to prune LCSs and identify a globally consistent state (GCS). A recovery process may occur when the program crashes during execution. The recovery process uses the state that was present at the time of crash, and reverts it back to a GCS that was identified previously.

Example Global State Manager

FIG. 1 shows an example global state manager 100 comprising components which, in some embodiments, carry out the functions described herein. In one example, global state manager 100 may be implemented in hardware, in other examples global state manager 100 may be implemented in a combination of hardware, with either or both of firmware and software (where the software and firmware are machine readable instructions). It is appreciated that global state manager 100 is a block diagram illustrating one example embodiment, and that other configurations within the scope of the present technology are possible. Locally consistent state identifier 110 identifies LCSs in accordance with embodiments discussed herein. Globally consistent state identifier 120 identifies GCSs in accordance with embodiments described herein. Dependence graph creator 130 captures ordering relationships among LCSs in the form of graphs in accordance with embodiments described herein. Incomplete state remover 140 removes states from a dependence graph which are incomplete as described in accordance with embodiments described herein. Locally consistent state remover 150 also removes LCSs from a dependence graph in accordance with embodiments described herein. Remaining locally consistent state identifier 160 assists in identifying a GCS in accordance with embodiments described herein. Happens-before relationship adder 170 adds happens-before relationships between memory states. Shared table creator 180 maintains a map from a memory address to the last value assigned to that memory address.

FIG. 1 additionally shows an example recovery manager 190 comprising components which, in some embodiments, carry out the functions described herein. In one example, recovery manager 190 may be implemented in hardware, in other examples recovery manager 190 may be implemented in a combination of hardware, with either or both of firmware and software (where the software and firmware are machine readable instructions). It is appreciated that recovery manager 190 is a block diagram illustrating one example embodiment, and that other configurations within the scope of the present technology are possible. Unique memory address identifier 191 recognizes distinct memory locations within a GCS. Memory state collector 192 gathers all duples from a GCS, each duple comprising a memory address and a value, for every distinct memory location identified within that GCS. Recovery graph builder 193 builds ordering relationships between the memory states collected by memory state collector 192. Most recent value identifier 194 recognizes the last value for a memory location identified by unique memory address identifier 191. Unique memory address reverter 195 sets the value of every memory location found by unique memory address identifier 191 to the last value found by most recent value identifier 194.

The components shown in FIG. 1 will be described in further detail below in conjunction with the corresponding technology.

Locally Consistent States

The present discussion identifies a consistent state without having a programmer specify it. Intuitively, a state is consistent within a thread when the thread is not holding any locks. In a multithreaded program using locks, identification of consistent states is made possible by identifying "outermost critical sections" (OCSs). An outermost critical section, for the purposes of the present discussion, is thread specific and identifies a section of code wherein at least one lock is held within the OCS and no locks are held immediately before entering and exiting that section of code. As an example, in a dynamic execution trace $A_1 A_2 \ldots A_n$, where $A_i$ refers to an instruction executed, we say that the section of the trace comprising $A_i, \ldots, A_j$ forms an OCS if all of the following hold:

At point $A_{i-1}$, no locks are held by this thread.
At point $A_i$, a lock is acquired by this thread.
At point $A_j$, a lock is released by this thread.
At point $A_{j+1}$, no locks are held by this thread.
At least one lock is always held between $A_i$ and $A_j$.

As described herein, a local consistent point (LCP) is a program point within the dynamic execution trace of a thread at the end of an OCS.

In one embodiment, locally consistent state identifier 110 identifies these points. With respect to a given LCP, for a given thread and a given memory location, the data values that are written, since the previous LCP, by that thread in a dynamic execution trace forms the locally consistent state (LCS). When LCSs are aggregated over all memory locations that the thread has written to, the LCS of the program data is obtained at the corresponding LCP in the dynamic execution trace. For the purposes of discussion herein, the following rule regarding the usage of locks is utilized:

If a lock is held by a thread, shared data is being protected by the lock from simultaneous access by multiple threads. Conversely, if no locks are held by a thread, a thread has satisfied all invariants with regards to the shared data that is modified under locks, before releasing all such locks. Therefore the values of the shared data a thread has written between two successive LCPs satisfies all program invariants.

An atomic section can be modeled by a critical section such that the start of an atomic section is modeled as an acquire of a global lock and the end of the atomic section is modeled as a release of the global lock. In one embodiment, the global state manager 100 handles multithreaded applications with a mixture of lock operations and atomic sections.

Globally Consistent States

A globally consistent state (GCS) is one that has the invariants satisfied across all threads throughout an application. This is in contrast to an LCS that identifies a locally consistent state for a single thread.

At a given instant of time, if the operation corresponding to an LCP has finished execution, an LCS is considered complete, otherwise the LCS is incomplete. Incompleteness can happen if, for example, a program crashes before reaching the corresponding LCP due to a hardware or software failure.

An arbitrary aggregation of LCSs across threads does not lead to a GCS. Table 1 shows example pseudo-code of two threads comprising three locally consistent points: (1) LCS1 201 is located where thread T1 finishes executing the instruction unlock (L1) at line 3 of thread T1; (2) LCS2 202 is located where thread T2 finishes executing the instruction unlock (L1) at line 4 of thread T2; and (3) LCS3 203 is located where thread T2 finishes executing the instruction unlock (L2) at line 11 of thread T2. To save space, the example threads in Table 1 are placed adjacent to each other. Their placement is not meant to indicate any type of order or relationship.

TABLE 1

| Example Psuedocode |
| --- |
| Initial LCS: $X = Y = Z = -1$ |

| Thread T1 | Thread T2 |
| --- | --- |
| 1 lock (L1) | 1 lock(L1) |
| 2 Z = X | 2 X = 0 |
| 3 unlock (L1) | 3 Z = 0 |
|  | 4 unlock (L1) |
|  | 5 lock (L2) |
|  | 6 Y = 2 |
|  | 7 lock (L1) |
|  | 8 X = 1 |
|  | 9 unlock (L1) |
|  | 10 <T1 executes here> |
|  | 11 unlock (L2) |

For the purpose of this example, consider the interleaving of threads where thread T2 executes first and acquires lock L1 at line 1, writes 0 to X at line 2, writes 0 to Z at line 3, releases lock L1 at line 4, acquires lock L2 at line 5, writes 2 to Y at line 6, acquires lock L1 at line 7, writes 1 to X at line 8, releases lock L1 at line 9, then thread T1 acquires lock L1 at line 1 during the execution of thread T1, reads from X and writes that value to Z at line 2, releases lock L1 at line 3, and then thread T2 releases lock L2 at line 11. Thus, X is assigned 1 by thread T2 at line 8 and thread T1 reads the value 1 when it reads from X. In this example, there are three locally consistent points: LCP1 at line 3 within T1, LCP2 at line 4 within T2, and LCP3 at line 11 within T2. LCS1, LCS2, and LCS3 correspond to LCP1, LCP2, and LCP3 respectively.

Figure 2:
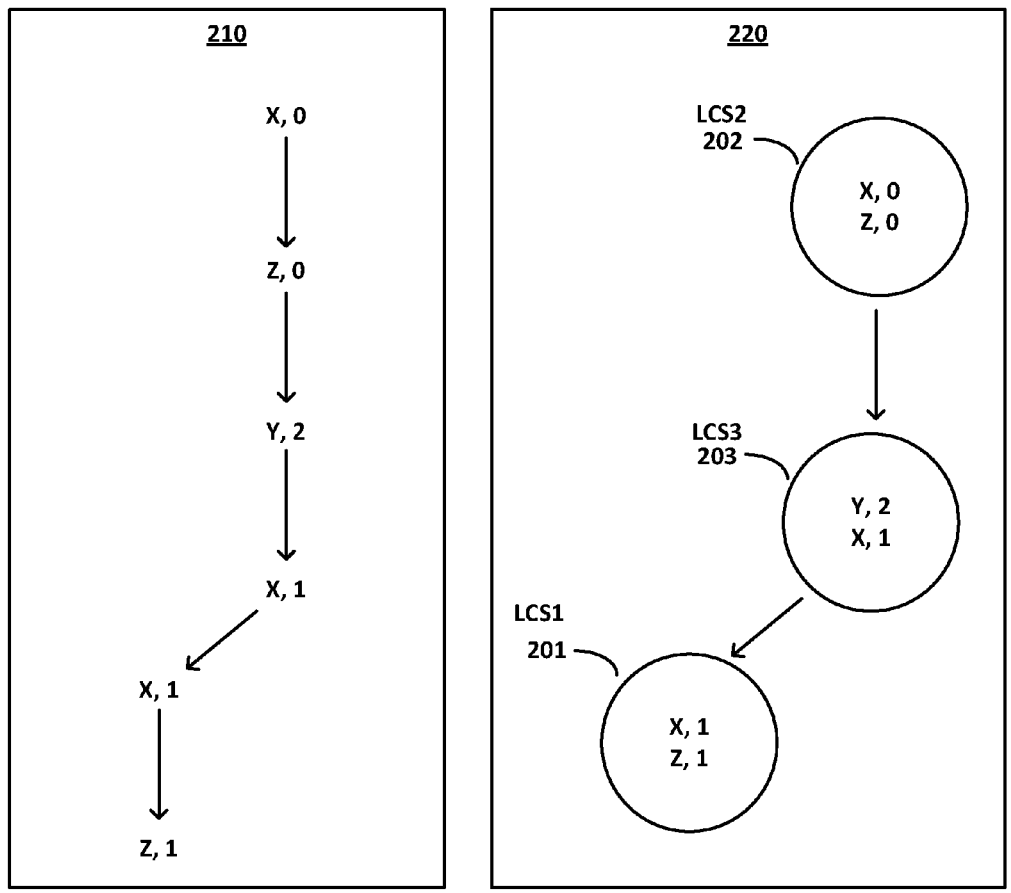
FIG. 2 shows ordering relationships in accordance with one embodiment.

FIG. 2 shows graphs 210 and 220 that are utilized by this disclosure for the code in Table 1. The happens-before relationship graph 210 maintains memory states and the happens-before edges among them. The LCS dependence graph 220 comprises locally consistent state 1 (LCS1) 201, locally consistent state 2 (LCS2) 202, and locally consistent state 3 (LCS3) 203 and dependence edges among them. Each duple, indicated by the pair memory location, data value represents a memory state in FIG. 2. The happens-before relationships between memory states lead to dependencies between LCSs. The initial LCS, shown in Table 1, is made up of initial values at the start of the program. X, 0 indicates that the value of memory location X is 0. A happens-before relationship from X, 0 to Z, 0 indicates that the value 0 is associated with X before the value 0 is associated with Z. A memory state can denote either a write or a read reference. For example, the state denoted by X, 1 in LCS1 201 is due to a read reference.

An analysis of the locally consistent states in this example would show that:

1. LCS1: This is not a globally consistent state. If only LCS1 is included, the recovered state following a failure will be (X=−1, Y=−1, Z=1). There exists no realizable interleaving of the statements from the two threads that would yield these values.
2. LCS2: This is a consistent state. If only LCS2 is included, the recovered state following a failure will be (X=0, Y=−1, Z=0). This is clearly realizable if only the first critical section in T2 executes.
3. LCS3: This is not a consistent state. If only LCS3 is included, the recovered state following a failure will be (X=1, Y=2, Z=−1). This is not possible since thread T2 executes its second critical section only after executing its first critical section.
4. LCS1+LCS2: This is not a consistent state. In this case, the recovered state following a failure will be (X=0, Y=−1, Z=1). For Z=1 to be true, X=1 has to be true too, showing that this combination is not realizable.
5. LCS1+LCS3: This is not a consistent state. Since the effects of the first critical section of T2 are not represented and this critical section executes before the second critical section of T2, this is not realizable.
6. LCS2+LCS3: This is a consistent state. The recovered state will be (X=1, Y=2, Z=0). It is realizable if both the critical sections of T2 have executed and T1 has not executed yet.
7. LCS1+LCS2+LCS3: This is a consistent state since both threads have finished executing.

Dependences Between Shared Memory References

Since the association between a shared location and its protecting lock is not explicit, it is difficult to determine when a shared location update is exposed to other threads. This is why points at which no locks are held are identified as the granularity at which LCSs can be formed. For the purposes of this discussion, dependence edge and dependency are used interchangeably.

As shown in FIG. 2, in one embodiment a happens-before relationship graph 210 is maintained in order to ensure that the correct GCS is computed correctly. In one embodiment, a node of the happens-before relationship graph 210 is identified as a memory state comprising the memory address involved in a memory reference and the value associated with it. In one embodiment, creating a happens-before relationship graph 210 is performed by creating a plurality of happens-before relationships between individual memory states that comprise the locally consistent states. In one embodiment, creating a plurality of happens-before relationships between the individual memory states captures an execution ordering between the memory states. A shared table, which is a map from a memory address to its last value, helps create the happens-before relationship graph 210. In some embodiments the shared table returns the last value of a memory reference upon receiving a query and inserts the current value in the shared table upon encountering a write to the corresponding memory reference.

In one embodiment, a happens-before relationship between a first memory state and a second memory state is built according to the following 2 rules:

First, if a first memory reference is executed by a given thread, a happens-before relationship is added from the memory state corresponding to the second memory reference that is executed immediately before the first memory reference by the same thread, to the memory state corresponding to the first memory reference.

Second, if a first memory reference (either a read or a write) to a shared location X is encountered within an OCS, the second memory reference that last wrote to the same location is obtained from the shared table. If these memory references are made by distinct threads, a happens-before relationship is recorded from the memory state corresponding to the second memory reference to the memory state corresponding to the first memory reference. Additionally, if the first memory reference is a write, the address and the corresponding state are added to the shared table.

In one embodiment, the shared table maintains a mapping from a memory address to a value that was last written the memory address, in which upon execution of a write command to a memory reference, the executing thread inserts the memory reference and a written value into the shared table. In one embodiment, a query of the shared table using a memory address yields a last value written to the memory reference.

FIG. 2 further shows LCS dependence graph 220 which corresponds with the example code shown above. Computation of a GCS is based on the dependence graph 220, and all the scenarios (1-7) described above can be derived from the dependence graph 220.

As an example, there is a dependence edge from LCS3 203 to LCS1 201 in FIG. 2. In this example, if LCS1 201 is to be included in a GCS, LCS3 203 has to be included as well. Since scenario 4 violates this requirement, it is inconsistent.

While computing a GCS, the invariant that needs to be maintained is as follows: if LCS $l_i$ is to be part of a GCS $g_i$, all ancestors of $l_i$ must also be a part of $g_i$. The ancestors need to be computed recursively and added to the corresponding GCS. In one embodiment this is done by maintaining a dependence graph 220 of LCSs that can form a GCS.

Example Methods of Use

The following discussion sets forth in detail the operation of some example methods of operation of embodiments. FIGS. 3 and 4 illustrate example procedures used by various embodiments. Flow diagrams 300 and 400 include some procedures that, in various embodiments, are carried out by some of the electronic devices illustrated in FIGS. 1, 5, or a processor under the control of computer-readable and computer-executable instructions. In this fashion, procedures described herein and in conjunction with flow diagrams 300 and 400 are or may be implemented using a computer, in various embodiments. The computer-readable and computer-executable instructions can reside in any tangible computer readable storage media, such as, for example, in data storage features such as volatile memory 508, non-volatile memory 510, and/or storage device 512 (all of FIG. 5). The computer-readable and computer-executable instructions, which reside on tangible computer readable storage media, are used to control or operate in conjunction with, for example, one or some combination of processor 506A, or other similar processor(s) 506B and 506C. Although specific procedures are disclosed in flow diagrams 300 and 400, such procedures are examples. That is, embodiments are well suited to performing various other procedures or variations of the procedures recited in flow diagrams 300 and 400. Likewise, in some embodiments, the procedures in flow diagrams 300 and 400 may be performed in an order different than presented and/or not all of the procedures described in this flow diagram may be performed, and additional operations may be added. It is further appreciated that procedures described in flow diagrams 300 and 400 may be implemented in hardware, or a combination of hardware, with either or both of firmware and software (where the firmware and software are in the form of computer readable instructions).

FIG. 3 is a flow diagram 300 of an example method for identifying a globally consistent state in a multithreaded program.

In operation 310, a plurality of locally consistent states in the multithreaded program are identified. In one embodiment, locally consistent state identifier 110 identifies the LCSs. In one embodiment, a locally consistent state of a thread comprises a set of memory locations and the corresponding data values, referred to as memory states. Moreover, in one embodiment, the set of memory states are those that occur in memory references between a last locally consistent state and a current locally consistent point. An initial locally consistent state of the thread comprises the memory locations and corresponding values of the memory locations available at the creation of the thread.

In operation 320, the globally consistent state is identified based at least in part on the locally consistent states. In one embodiment, globally consistent state identifier 120 identifies the GCSs. In one embodiment, to identify the globally consistent state, a dependence graph 220 is created, wherein the dependence graph 220 comprises dependencies among the plurality of locally consistent states. In one embodiment, dependence graph 220 is created by dependence graph creator 130. Any locally consistent state of the plurality of locally consistent states in which the locally consistent state in incomplete is removed from dependence graph 220. In one embodiment, this is performed by incomplete state remover 140. Any locally consistent state of the plurality of the locally consistent states in which the locally consistent state does not have an ancestor locally consistent state in the dependence graph is also removed. In one embodiment, this is performed by locally consistent state remover 150. Remaining locally consistent states within the dependence graph 220 are identified as a globally consistent state. In one embodiment, this is performed by remaining locally consistent state identifier 160.

In one embodiment, the locally consistent state is considered incomplete if all memory references corresponding to the locally consistent state have not finished execution. In one embodiment, a memory reference may not have finished execution due to an order of creation of the plurality of the locally consistent states. In one embodiment, a memory reference may not have finished execution because of a program crash caused by a failure. For example, a hardware failure such as a power outage could cause a crash. As another example, a software crash could cause a failure.

The dependences between LCSs follow the happens-before relationships between the memory states contained in them. Given two LCSs, $lcs_i$ and $lcs_j$, where i≠j, if there exists a happens-before dependence from a memory state in $lcs_i$ to a memory state in $lcs_j$, then a dependence edge is added from $lcs_i$ to $lcs_j$.

In operation 330, in one embodiment, a potentially inconsistent state obtained on a program crash is reverted to a pre-identified globally consistent state. In one embodiment, reverting the potentially inconsistent state to a pre-identified globally consistent state involves identifying unique memory addresses that make up the consistent state. In one embodiment it further involves collecting all memory states that write to a unique memory address from the locally consistent states that comprise the pre-identified globally consistent state for unique memory addresses. Further, in one embodiment, the reversion involves adding a recovery edge from a first memory state of a plurality of collected memory states to a second memory state of a plurality of collected memory states corresponding to an identical memory address within collected memory states if a path exists from the first memory state to the second memory state through happens-before relationship edges that exist between individual memory states. In one embodiment, the second memory state depends on the first memory state if there is a recovery edge from a first memory state to a second memory state.

FIG. 4 is a flowchart of a method for reverting a potentially inconsistent state obtained on a program crash to a pre-identified globally consistent state in a multithreaded program. In some embodiments, recovery manager 190, and the modules that comprise recovery manager 190, perform the operations discussed herein.

In operation 410, in some embodiments, unique memory addresses that make up the pre-identified globally consistent state are identified. In some embodiments this operation is performed by unique memory address identifier 191.

In operation 420, in some embodiments, all memory states that correspond to write references to a unique memory address within a plurality of LCSs that comprise the pre-identified GCS are collected. In some embodiments this operation is performed by memory state collector 192 for every unique memory address identified by unique memory address identifier 191.

In operation 430, in some embodiments, a recovery edge from a first memory state of a plurality of collected memory states is added to a second memory state of a plurality of collected memory states corresponding to an identical memory address within collected memory states if a path exists from the first memory state to the second memory state through happens-before relationships that exist between individual memory states. In some embodiments, the second memory state is dependent on the first memory state if there is a recovery edge from a first memory state to a second memory state. Operation 430 is performed by recovery graph builder 193.

In operation 440, in some embodiments, a most recent value for the unique memory addresses is identified. In some embodiments this operation is performed by most recent value identifier 194. In some embodiments the most recent value comprises a value written by the memory state on which no other memory state depends in a recovery graph.

In operation 450, in some embodiments, the unique memory addresses are reverted to a state of the most recent value. In some embodiments, this operation is performed by unique memory address reverter 195.

Example Computer System

Figure 5:
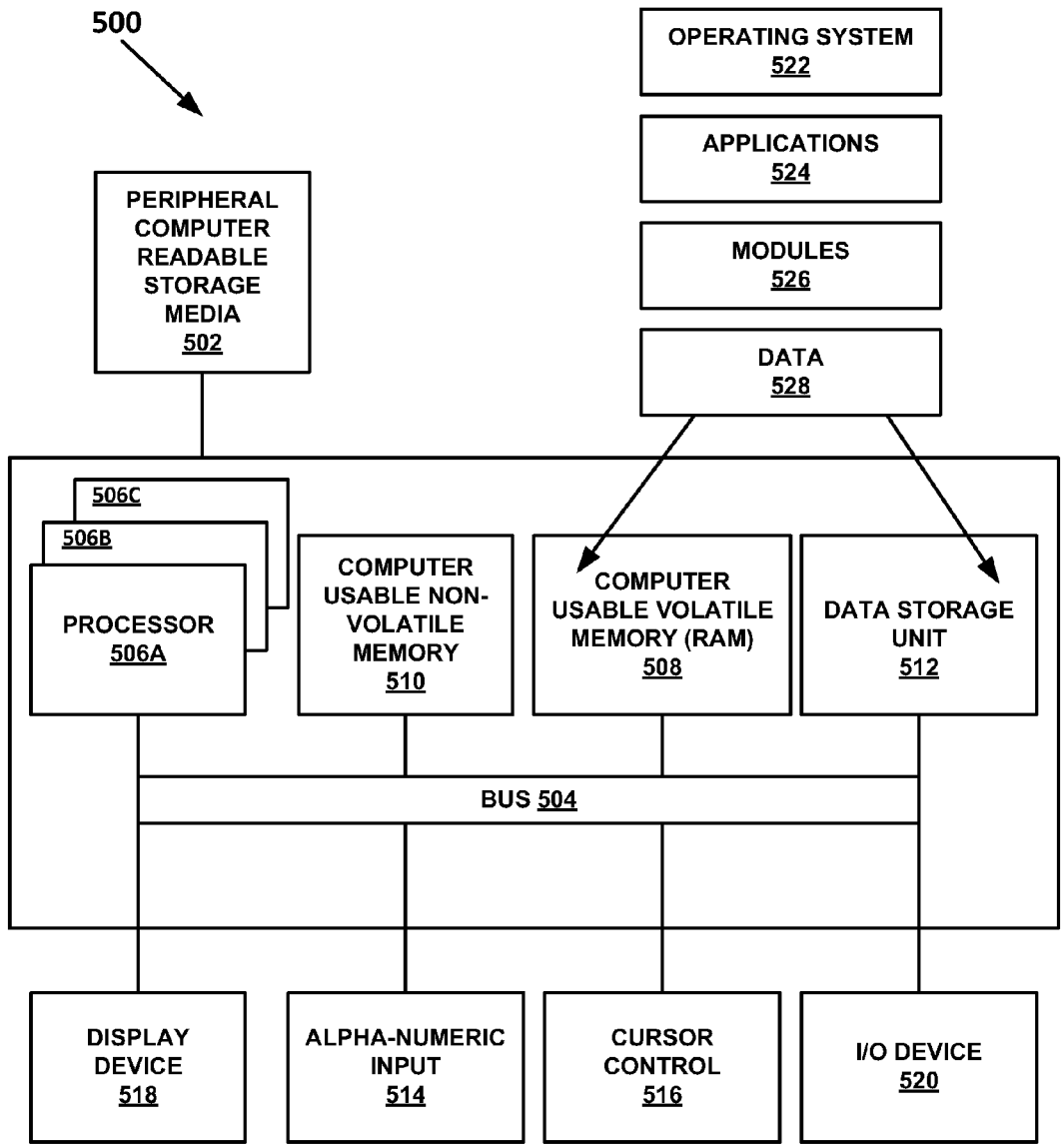
FIG. 5 is a block diagram of a computing system used in accordance with one embodiment.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments which are discussed herein. It is appreciated that computer system 500 of FIG. 5 is an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, and the like. In one embodiment, computer system 500 may be a single server or a plurality of servers. Computer system 500 of FIG. 5 is well adapted to having peripheral tangible computer-readable storage media 502 such as, for example, a floppy disk, a compact disc, digital versatile disc, other disc based storage, universal serial bus "thumb" drive, removable memory card, and the like coupled thereto. The tangible computer-readable storage media is non-transitory in nature.

System 500 of FIG. 5 includes an address/data bus 504 for communicating information, and a processor 506A coupled with bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g., random access memory (RAM), coupled with bus 504 for storing information and instructions for processors 506A, 506B, and 506C. System 500 also includes computer usable non-volatile memory 510 including, but not limited to: read only memory (ROM) (e.g., programmable ROM (PROM) erasable PROM (EPROM), electrically erasable PROM (EEPROM)), solid state drives, flash memory, ferroelectric RAM (F-RAM), magnetoresistive RAM (MRAM), magnetic computer storage devices (e.g., hard disks, floppy disks and magnetic tape), optical disks, etc. Non-volatile memory 510 is coupled with bus 504 for storing static information and instructions for processors 506A, 506B, and 506C. Also present in system 500 is a data storage unit 512 (e.g., a magnetic or optical disk and disk drive) coupled with bus 504 for storing information and instructions. System 500 may also include an alphanumeric input device 514 including alphanumeric and function keys coupled with bus 504 for communicating information and command selections to processor 506A or processors 506A, 506B, and 506C. System 500 may also include cursor control device 516 coupled with bus 504 for communicating user input information and command selections to processor 506A or processors 506A, 506B, and 506C. In one embodiment, system 500 may also include display device 518 coupled with bus 504 for displaying information.

Referring still to FIG. 5, display device 518 of FIG. 5, when included, may be a liquid crystal device, cathode ray tube, plasma display device or other display device suitable for creating graphic images and alphanumeric characters recognizable to a user. Cursor control device 516, when included, allows the computer user to dynamically signal the movement of a visible symbol (cursor) on a display screen of display device 518 and indicate user selections of selectable items displayed on display device 518. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508 (e.g., RAM), computer usable non-volatile memory 510, and data storage unit 512. In some embodiments, all or portions of various embodiments described herein are stored, for example, as an application 524 and/or module 526 in memory locations within RAM 508, computer-readable storage media within data storage unit 512, peripheral computer-readable storage media 502, and/or other tangible computer-readable storage media.

Embodiments of the present technology are thus described. While the present technology has been described in particular examples, it should be appreciated that the present technology should not be construed as limited by such examples, but rather construed according to the following claims.

What is claimed is:

1. A method for identifying a globally consistent state in a multithreaded program, said method comprising:
    identifying a plurality of locally consistent states in said multithreaded program, wherein a locally consistent state of a thread comprises a set of memory locations and their corresponding data values accessed between points in said multithreaded program where no locks are held; and
    identifying said globally consistent state based at least in part on said locally consistent states.

2. The method of Cairn 1 wherein said identifying said globally consistent state comprises:
    creating a dependence graph, wherein said dependence graph comprises dependencies among said plurality of locally consistent states;
    removing any locally consistent state of said plurality of locally consistent states from said dependence graph, wherein said locally consistent state is incomplete;
    removing any said locally consistent state of said plurality of locally consistent states from said dependence graph, wherein said locally consistent state does not have an ancestor locally consistent state in said dependence graph; and
    identifying any remaining locally consistent state within said dependence graph as said globally consistent state.

3. The method of claim 2 wherein said locally consistent state is considered incomplete if all memory references corresponding to said locally consistent state have not finished execution.

4. The method of claim 2 wherein creating said dependence graph is performed by creating a plurality of happens-before relationships between individual memory states that comprise said plurality of locally consistent states.

5. The method of claim 4 wherein said creating said plurality of happens-before relationships between said individual memory states comprises:
    capturing an execution ordering between said memory states;
    adding a happens-before relationship from a state corresponding to a first memory reference to a state corresponding to a second memory reference executed by a single thread, wherein said second memory reference is executed immediately after said first memory reference; and
    adding a happens-before relationship from a first memory state returned by a shared table to a second memory state used to query said shared table if said first memory reference corresponding to said first memory state and said second memory reference corresponding to said second memory state are executed by distinct threads.

6. The method of claim 5 wherein said shared table maintains a mapping from a memory address to a value that was last written to said memory address, wherein upon execution of a write command to a memory reference, an executing thread inserts said memory reference and a written value into said shared table, and wherein a query of said shared table using a memory address yields a memory state corresponding to a last value written to said memory reference.

7. The method of claim 1 further comprising:
    reverting a potentially inconsistent state obtained on a program crash to a pre-identified globally consistent state.

8. The method of claim 7 wherein said reverting said potentially inconsistent state to said pre-identified globally consistent state comprises:
    identifying unique memory addresses that make up said globally consistent state;
    collecting all memory states that correspond to write references to said unique memory addresses from said locally consistent states that comprise said pre-identified globally consistent state for unique memory addresses;
    adding a recovery edge from a first memory state of a plurality of collected memory states to a second memory state of a plurality of collected memory states corresponding to an identical memory address within collected memory states if a path exists from said first memory state to said second memory state through happens-before relationships that exist between individual memory states, wherein said second memory state is said to depend on said first memory state if there is a recovery edge from a first memory state to a second memory state;
    identifying a most recent value for every said unique memory address, wherein said most recent value comprises the value corresponding to the memory state on which no other memory state depends in a recovery graph; and
    reverting every said unique memory address to a state of said most recent value.

9. A non-transitory computer-usable storage medium having instructions embedded therein that when executed cause a computing system to revert a potentially inconsistent state to a pre-identified globally consistent state in a multithreaded program, said instructions comprising instructions to:
    identify unique memory addresses that make up said pre-identified globally consistent state;
    collect all memory states that correspond to write references to said unique memory addresses from a plurality of locally consistent states that comprise said pre-identified globally consistent state for unique memory addresses;
    add a recovery edge from a first memory state of a plurality of collected memory states to a second memory state of a plurality of collected memory states corresponding to an identical memory address within collected memory states if a path exists from said first memory state to said second memory state through happens-before relationships that exist between individual memory states, wherein said second memory state is dependent on said first memory state if there is a recovery edge from a first memory state to a second memory state;
    identify a most recent value for every said unique memory address, wherein said most recent value comprises a value corresponding to the memory state on which no other memory state depends in a recovery graph; and
    revert every said unique memory address to a state of said most recent value.

10. The non-transitory computer-usable storage medium of claim 9 wherein said pre-identified globally consistent state is based at least in part on locally consistent states in said multithreaded program, wherein a locally consistent state of a thread comprises a set of memory locations and their corresponding data values between points in said multithreaded program where no locks are held.

11. The non-transitory computer-usable storage medium of claim 9 wherein the instructions to pre-identify said globally consistent state in a multithreaded program comprises instructions to:
create a dependence graph, wherein said dependence graph comprises dependencies among said plurality of locally consistent states;
remove any locally consistent state of said plurality of locally consistent states from said dependence graph, wherein said locally consistent state is incomplete;
remove any said locally consistent state of said plurality of locally consistent states from said dependence graph, wherein said locally consistent state does not have an ancestor locally consistent state in said dependence graph; and
identify any remaining locally consistent state within said dependence graph as said globally consistent state.

12. The non-transitory computer-usable storage medium of claim 11 wherein said locally consistent state is considered incomplete if all memory references corresponding to said locally consistent state have not finished execution.

13. The non-transitory computer-usable storage medium of claim 11 wherein to create said dependence graph is performed by creating a plurality of happens-before relationships between individual memory states that comprise said locally consistent states.

14. The non-transitory computer-usable storage medium of claim 13 wherein to create said plurality of happens-before relationships between said individual memory states comprises to:
capture an execution ordering between said memory states;
add a happens-before relationship from a state corresponding to a first memory reference to a state corresponding to a second memory reference executed by a single thread, wherein said second memory reference is executed immediately after said first memory reference; and
add a happens-before relationship from said first memory state returned by a shared table to said second memory state used to query said shared table if said first memory reference corresponding to said first memory state and said second memory reference corresponding to said second memory state are executed by distinct threads.

15. The non-transitory computer-usable storage medium of claim 14 wherein said shared table maintains a mapping from a memory address to a value that was last written to said memory address, wherein upon execution of a write command to a memory reference, an executing thread inserts said memory reference and a written value into said shared table, and wherein a query of said shared table using a memory address yields a memory state corresponding to a last value written to said memory reference.

16. A non-transitory computer-usable storage medium having computer readable program code embedded therein that when executed causes a computing system comprising a non-volatile memory to manage globally consistent states, said program code comprising:
a locally consistent state identifier to identify a plurality of locally consistent states in a multithreaded program, wherein a locally consistent state of a thread comprises a set of memory locations and their corresponding data values between points in said multithreaded program where no locks are held; and
a globally consistent state identifier to identify said globally consistent state based at least in part on said locally consistent states.

17. The non-transitory computer-usable storage medium of claim 16 wherein said program code further comprises:
a dependence graph creator to create a dependence graph, wherein said dependence graph comprises dependencies among said plurality of locally consistent states;
an incomplete state remover to remove any said locally consistent state of said plurality of locally consistent states from said dependence graph, wherein said locally consistent state is incomplete;
a locally consistent state remover to remove any said locally consistent state of said plurality of locally consistent states from said dependence graph, wherein said locally consistent state does not have an ancestor locally consistent state in said dependence graph; and
a remaining locally consistent state identifier to identify any remaining locally consistent state within said dependence graph as said globally consistent state.

18. The non-transitory computer-usable storage medium of claim 16 wherein the dependence graph creator creates a dependence graph by creating a plurality of happens-before relationships between individual memory states that comprise said locally consistent states.

19. The non-transitory computer-usable storage medium of claim 18 wherein creating said plurality of happens-before relationships between said individual memory states captures an execution ordering between said memory states and comprises:
a happens-before relationship adder to add a happens-before relationship from a state corresponding to a first memory reference to a state corresponding to a second memory reference executed by a single thread, wherein said second memory reference is executed immediately after said first memory reference; and
a happens-before relationship adder to add a happens-before relationship from a first memory state returned by a shared table to a second memory state used to query said shared table if said first memory reference corresponding to said first memory state and said second memory reference corresponding to said second memory state are executed by distinct threads.

20. The non-transitory computer-usable storage medium of claim 19 wherein said shared table maintains a mapping from a memory address to a value that was last written to said memory address, wherein upon execution of a write command to a memory reference, an executing thread inserts said memory reference and a written value into said shared table, and wherein a query of said shared table using a memory address yields a last value written to said memory reference.

* * * * *